United States Patent

Sadamitsu et al.

(10) Patent No.: US 9,213,130 B2
(45) Date of Patent: Dec. 15, 2015

(54) AZO COMPOUND AND SALT THEREOF, AND DYE-CONTAINING POLARIZING FILM COMPRISING THE COMPOUND OR SALT

(71) Applicants: Nippon Kayaku Kabushiki Kaisha, Chiyoda-ku, Tokyo (JP); Polatechno Co., Ltd., Joetsu-shi, Niigata (JP)

(72) Inventors: Yuichi Sadamitsu, Tokyo (JP); Takuto Nishiguchi, Tokyo (JP); Hiroaki Ohno, Tokyo (JP)

(73) Assignees: Nippon Kayaku Kabushiki Kaisha, Tokyo (JP); Polatechno Co., Ltd., Niigata (JP)

( * ) Notice: Subject to any disclaimer, the term of this patent is extended or adjusted under 35 U.S.C. 154(b) by 98 days.

(21) Appl. No.: 14/043,056

(22) Filed: Oct. 1, 2013

(65) Prior Publication Data

US 2014/0029099 A1 Jan. 30, 2014

Related U.S. Application Data

(62) Division of application No. 12/948,395, filed on Nov. 17, 2010, now Pat. No. 8,643,809, which is a division of application No. 12/227,613, filed as application No. PCT/JP2007/060623 on May 24, 2007, now Pat. No. 7,931,702.

(30) Foreign Application Priority Data

Jun. 1, 2006 (JP) ................. 2006-153524

(51) Int. Cl.
*C09B 35/52* (2006.01)
*G02B 5/30* (2006.01)
*C09B 56/04* (2006.01)

(52) U.S. Cl.
CPC ............... *G02B 5/305* (2013.01); *C09B 56/04* (2013.01); *G02B 5/30* (2013.01); *Y10T 428/1041* (2015.01)

(58) Field of Classification Search
CPC ................. C09B 31/00; C09B 56/04
USPC ................. 8/459–664; 252/573–582, 299.01, 252/299.62, 585; 313/498; 349/96; 428/1.131; 534/797, 806
See application file for complete search history.

(56) References Cited

U.S. PATENT DOCUMENTS

| | | |
|---|---|---|
| 2,004,250 A | 6/1935 | Schindhelm |
| 2,270,451 A | 1/1942 | Keller |
| 2,671,775 A | 3/1954 | Hanhart |
| 2,817,659 A | 12/1957 | Bossard et al. |
| 4,051,123 A | 9/1977 | Piller et al. |
| 4,118,232 A | 10/1978 | Piller et al. |
| 4,556,707 A | 12/1985 | Henk |
| 4,954,133 A | 9/1990 | Oppliger |
| 5,007,942 A | 4/1991 | Claussen et al. |
| 5,272,259 A | 12/1993 | Claussen et al. |
| 5,318,856 A | 6/1994 | Misawa et al. |
| 5,446,135 A | 8/1995 | Misawa et al. |
| 5,700,296 A | 12/1997 | Ogino et al. |
| 5,731,421 A | 3/1998 | Tzikas et al. |

(Continued)

FOREIGN PATENT DOCUMENTS

| | | |
|---|---|---|
| CN | 1220683 A | 6/1999 |
| CN | 1331807 A | 1/2002 |

(Continued)

OTHER PUBLICATIONS

Office Action mailed Jul. 16, 2014 in co-pending U.S. Appl. No. 12/993,643.

(Continued)

*Primary Examiner* — Tri V Nguyen
(74) *Attorney, Agent, or Firm* — Nields, Lemack & Frame, LLC

(57) ABSTRACT

Disclosed is an azo compound represented by the general formula (1) or a salt thereof:

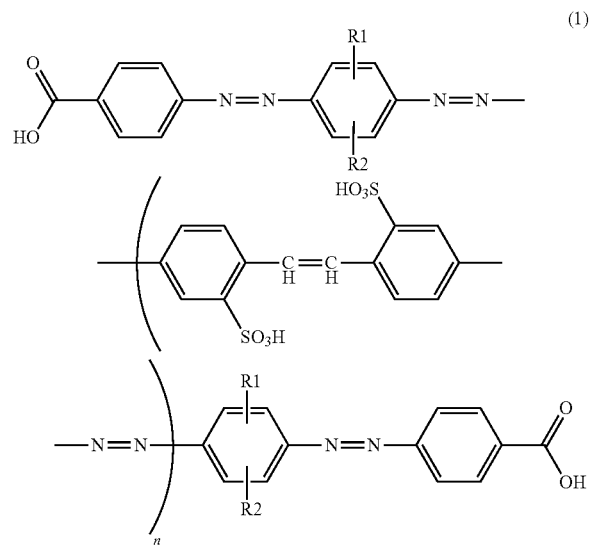

wherein R1 and R2 independently represent a hydrogen atom, a lower alkyl group or a lower alkoxy group; and n represents 1 or 2. Also disclosed are a dye-containing polarizing film and a dye-containing polarizing plate, each of which comprises a polarizing film base material and the azo compound contained in the base material.

21 Claims, No Drawings

(56) References Cited

U.S. PATENT DOCUMENTS

| | | | |
|---|---|---|---|
| 5,739,298 | A | 4/1998 | Misawa et al. |
| 6,049,428 | A | 4/2000 | Khan et al. |
| 6,143,062 | A | 11/2000 | Miyazawa et al. |
| 6,399,752 | B1 | 6/2002 | Ohta et al. |
| 6,552,849 | B1 | 4/2003 | Furuhashi et al. |
| 6,563,640 | B1 | 5/2003 | Ignatov et al. |
| 6,699,976 | B2 | 3/2004 | Ashida et al. |
| 6,790,490 | B1 | 9/2004 | Oiso et al. |
| 7,245,431 | B2 | 7/2007 | Watson et al. |
| 7,304,147 | B2 | 12/2007 | Sadamitsu et al. |
| 7,387,668 | B2 | 6/2008 | Kitayama et al. |
| 7,445,822 | B2 | 11/2008 | Sadamitsu |
| 7,514,129 | B2 | 4/2009 | Sadamitsu |
| 7,931,702 | B2 | 4/2011 | Sadamitsu et al. |
| 8,232,375 | B2 | 7/2012 | Higeta et al. |
| 8,389,122 | B2 | 3/2013 | Sadamitsu et al. |
| 8,389,124 | B2 | 3/2013 | Sadamitsu et al. |
| 8,477,268 | B2 | 7/2013 | Nishiguchi et al. |
| 8,643,809 | B2 | 2/2014 | Sadamitsu et al. |
| 8,771,378 | B2 | 7/2014 | Sadamitsu et al. |
| 8,940,059 | B2 | 1/2015 | Sadamitsu et al. |
| 2003/0090012 | A1 | 5/2003 | Allen et al. |
| 2003/0098447 | A1 | 5/2003 | Ashida et al. |
| 2004/0218118 | A1 | 11/2004 | Hayashi |
| 2004/0232394 | A1 | 11/2004 | Khan et al. |
| 2005/0003109 | A1 | 1/2005 | Oiso et al. |
| 2007/0079740 | A1 | 4/2007 | Sadamitsu et al. |
| 2007/0119341 | A1 | 5/2007 | Kitayama et al. |
| 2007/0166483 | A1 | 7/2007 | Sadamitsu |
| 2007/0287830 | A1 | 12/2007 | Sano et al. |
| 2008/0094549 | A1 | 4/2008 | Sadamitsu |
| 2008/0193660 | A1 | 8/2008 | Matsui et al. |
| 2009/0174942 | A1 | 7/2009 | Sadamitsu et al. |
| 2010/0226008 | A1 | 9/2010 | Higeta et al. |
| 2010/0257678 | A1 | 10/2010 | Sadamitsu et al. |
| 2011/0060134 | A1 | 3/2011 | Sadamitsu et al. |
| 2011/0063546 | A1 | 3/2011 | Sadamitsu et al. |
| 2011/0075076 | A1 | 3/2011 | Nishiguchi et al. |
| 2011/0089383 | A1 | 4/2011 | Sadamitsu et al. |
| 2011/0164208 | A1 | 7/2011 | Nishiguchi et al. |
| 2011/0267691 | A1 | 11/2011 | Sadamitsu et al. |

FOREIGN PATENT DOCUMENTS

| | | | |
|---|---|---|---|
| CN | 1523375 | A | 8/2004 |
| CN | 1774480 | A | 5/2006 |
| CN | 1914283 | A | 2/2007 |
| DE | 1644179 | A1 | 7/1971 |
| DE | 3236238 | A1 | 5/1984 |
| EP | 0146747 | A2 | 7/1985 |
| EP | 0530106 | A1 | 3/1993 |
| EP | 0549342 | A2 | 6/1993 |
| EP | 0626598 | A2 | 11/1994 |
| EP | 0632105 | A1 | 1/1995 |
| EP | 0982371 | A1 | 3/2000 |
| EP | 1203969 | A1 | 5/2002 |
| EP | 1614719 | A1 | 1/2006 |
| FR | 1541972 | A | 10/1968 |
| GB | 736619 | * | 9/1955 |
| GB | 954100 | B | 4/1964 |
| JP | 47-018548 | B1 | 5/1972 |
| JP | 58-145761 | A | 8/1983 |
| JP | 60-115671 | A | 6/1985 |
| JP | 60-156759 | A | 8/1985 |
| JP | 60-168743 | A | 9/1985 |
| JP | 60-243157 | A | 12/1985 |
| JP | 60-243176 | A | 12/1985 |
| JP | 2-269136 | A | 11/1990 |
| JP | 3-12606 | A | 1/1991 |
| JP | 5-295281 | A | 11/1993 |
| JP | 2622748 | B2 | 6/1997 |
| JP | 2001-33627 | A | 2/2001 |
| JP | 2001-56412 | A | 2/2001 |
| JP | 2001-108828 | A | 4/2001 |
| JP | 2001-240762 | A | 9/2001 |
| JP | 2002-275381 | A | 9/2002 |
| JP | 2003-35819 | A | 2/2003 |
| JP | 2003-215338 | A | 7/2003 |
| JP | 2004-51645 | A | 2/2004 |
| JP | 2004-75719 | A | 3/2004 |
| JP | 2004-323712 | A | 11/2004 |
| JP | 2004-338876 | A | 12/2004 |
| RU | 2110822 | C1 | 5/1998 |
| RU | 2155978 | C2 | 9/2000 |
| WO | 2004/013232 | A1 | 2/2004 |
| WO | 2004/092282 | A1 | 10/2004 |
| WO | 2005/033211 | A1 | 4/2005 |
| WO | 2005/075572 | A1 | 8/2005 |
| WO | 2006/051850 | A1 | 5/2006 |
| WO | 2006/057214 | A1 | 6/2006 |
| WO | 2007/145210 | A1 | 12/2007 |
| WO | 2007/148757 | A1 | 12/2007 |

OTHER PUBLICATIONS

Notice of Allowance mailed Sep. 26, 2014 in co-pending U.S. Appl. No. 12/974,581.
Office Action mailed Feb. 25, 2014 in co-pending U.S. Appl. No. 12/974,581.
Final Rejection mailed Feb. 4, 2015 in co-pending U.S. Appl. No. 12/993,643.
Notice of Allowance mailed Mar. 7, 2014 in corresponding U.S. Appl. No. 12/948,404.
Miscellaneous communication mailed Apr. 2, 2014 in corresponding U.S. Appl. No. 12/948,404.
Senryo Kagaku (Dye Chemistry), with English Translations, 1st Edition Nov. 30, 1957, 4th Edition Aug. 15, 1966, pp. 618-619 and pp. 634-635, by Hosoda.
Senryo Kagaku (Dye Chemistry), with English translation, 1st Edition Nov. 30, 1957, 4th Edition Aug. 15, 1966, pp. 611-613, by Hosoda.
Senryo Kagaku (Dye Chemistry), with English translation, 1st Edition Nov. 30, 1957, 4th Edition Aug. 15, 1966, p. 626, Hosoda et al.
Thieme, vol. 10/3, part 3, (1952) pp. 339-346, XP002536512, "Methoden der Organischen Chemie", Houben et al.
Jour. Chem. Soc. Pak., 2002, vol. 24, No. 1, pp. 10-17, "Stilbene Based Direct Dyes-Effect of Fixing Agents on the Fastness and Colour Properties," Waheed et al.
International Search Report dated Jun. 26, 2007 in corresponding PCT application No. PCT/JP2007/060623.
European Communication dated Oct. 12, 2009 in corresponding European patent application No. EP 07744057.6.
Russian Communication, with English translation, dated Feb. 12, 2011 in corresponding Russian patent application No. RU2008152360/05.
Japanese Communication, with English translation, mailed May 8, 2012 in corresponding Japanese Patent Application No. JP 2008-517886.
European Communication dated Jul. 28, 2009 in co-pending European patent application No. EP 07745100.3.
International Search Report dated Sep. 11, 2007 in PCT application PCT/JP2007/061813.
European Communication dated Jul. 28, 2009 in co-pending European patent application No. EP 07767335.8.
European Communication dated May 7, 2010 in co-pending European patent application No. EP 10151418.0.
RU Communication, with English translation, dated Nov. 3, 2010 in co-pending Russian patent application RU 2009101945/05.
International Search Report dated Sep. 11, 2007 in co-pending PCT application PCT/JP2007/062509.
International Search Report dated Dec. 9, 2008 in co-pending PCT application PCT/JP2008/069723.
International Search Report dated Aug. 4, 2009 in co-pending PCT application PCT/JP2009/059173.
Chinese Communication, with English translation, issued Oct. 31, 2012 in co-pending Chinese Patent Application No. 200980118425.X.

(56) References Cited

OTHER PUBLICATIONS

International Search Report dated Aug. 4, 2009 in co-pending foreign application PCT/JP2009/059172.
Chinese Communication, with English translation, issued Nov. 19, 2012 in co-pending Chinese Patent Application No. CN200980122710.9.
Office Action mailed Nov. 6, 2013 in corresponding U.S. Appl. No. 12/948,404.
Notice of Allowance mailed Oct. 18, 2013 in corresponding U.S. Appl. No. 12/948,395.
Office Action dated Sep. 30, 2010 in abandoned U.S. Appl. No. 12/308,282.
Final Rejection dated Mar. 17, 2011 in abandoned U.S. Appl. No. 12/308,282.
Office Action—Restriction—mailed Nov. 22, 2013 in co-pending U.S. Appl. No. 12/974,581.
Office Action mailed Dec. 6, 2012 in co-pending U.S. Appl. No. 12/993,643.
Final Rejection mailed Jun. 10, 2013 in co-pending U.S. Appl. No. 12/993,643.

* cited by examiner

AZO COMPOUND AND SALT THEREOF, AND DYE-CONTAINING POLARIZING FILM COMPRISING THE COMPOUND OR SALT

This application is a divisional of Ser. No. 12/948,395 filed Nov. 17, 2010, which is a divisional of Ser. No. 12/227,613 filed Nov. 21, 2008 (now U.S. Pat. No. 7,931,702), which is a §371 of PCT/JP2007/060623 filed May 24, 2007, the disclosures of which are hereby incorporated by reference.

TECHNICAL FIELD

The present invention relates to a novel azo compound and a salt thereof, and a dye-containing polarizing film comprising the compound or salt.

BACKGROUND ART

A polarizing plate having a function to transmit or shield light is a fundamental constituent element of a display device such as a liquid crystal display (LCD) along with liquid crystals which have a function of switching light. The area of application of this LCD has expanded broadly from small items such as an electronic calculator, a watch, and the like in the early day to a notebook computer, a word processor, a liquid crystal projector, a liquid crystal television, a car navigation system, indoor and outdoor measurement instruments, and the like. Also, the LCD is used in broad conditions from low to high temperature, from low to high humidity, and from low to high light intensity. Thus, a polarizing plate having high polarizing performance and excellent durability is desired.

At present, a polarizing film is manufactured by dyeing a polarizing film substrate with or incorporating therein iodine or a dichromatic dye as a polarizing element, wherein the substrate is a stretched and oriented film of polyvinyl alcohol or its derivative, or an oriented film of polyene prepared by dehydrochlorination of a polyvinyl chloride film or dehydration of a polyvinyl alcohol film. Among these, an iodine polarizing film which uses iodine as the polarizing element exhibits superior initial polarizing performance. On the other hand, this polarizing film is weak to moisture and heat, and when it is used for a long time under a condition of high temperature and high humidity, there arises a problem of durability. In order to improve durability, methods such as treatment of a polarizing film with formalin or an aqueous solution containing boric acid, use of a polymer film of low moisture permeability as a protect film, and the like are considered. However, the effects of these methods are not satisfactory. On the other hand, a dye-containing polarizing film comprising a dichromatic dye as a polarizing element has better humidity resistance and heat resistance than an iodine polarizing film, but, generally, initial polarizing performance of the dye-containing polarizing element is insufficient.

In a neutral color polarizing film produced by adsorbing several dichromatic dyes to a polymer film followed by orientation, if there is light leakage (color leakage) of a specific wavelength in the wavelength range of visible light, in a state (the perpendicular position) that two polarizing films are superimposed on each other in such a way that their orientation directions are perpendicular to each other, the hues of the liquid crystal display may change in the dark state when the polarizing films are fitted to the liquid crystal display panel. Thus, in order to prevent the color change of a liquid crystal display due to color leakage of a specific wavelength in the dark state when a polarizing film is fitted to a liquid crystal display device, it is necessary to uniformly lower the average light transmittance at the perpendicular position (perpendicular average light transmittance) in the wavelength range of visible light.

Further, in a case of a color liquid crystal projection display, namely, a color liquid crystal projector, a polarizing plate is used for a liquid crystal image-forming part. In this application, the iodine polarizing plate was used formerly, which has good polarization performance and exhibits neutral gray color. However, as mentioned above, the iodine polarizing plate has a problem that its light resistance, heat resistance, and wet heat resistance are insufficient, because iodine is a polarizer. In order to solve this problem, a neutral gray polarizing plate using a dye-containing dichromatic colorant as a polarizer has come to be used. In a neutral gray polarizing plate, colorants of three primary colors are generally used in combination in order to improve transmittance in the entire wavelength range of visible light and polarization performance averagely. Thus, there is a problem that to the demand of the marketplace for more brightness as in the color liquid crystal projector, the transmittance is still poor, and in order to realize brightness, it is necessary to increase intensity of the light source. In order to solve this problem, three polarizing plates corresponding to three primary colors, namely, plates for each of the blue channel, the green channel, and the red channel have come to be used.

Decrease in brightness cannot be avoided because an image of such a small area as 0.5 to 3 inches is magnified to about several tens to one hundred and tens of inches, and light is absorbed considerably by the polarizing plate. Therefore, as the light source, one of high luminance is used. Furthermore, desire for further increase in brightness of a liquid crystal projector is strong and, as a result, the intensity of the light source used is inevitably growing stronger. Along with this, the amounts of light and heat which the polarizing film receives are increasing.

However, conventional polarizing plates have not yet satisfied the market needs sufficiently in terms of polarization characteristics, the range of absorption wavelength, hues, and the like. Furthermore, among the polarizing plates corresponding to three primary colors for a color liquid crystal projector, namely, the plates for each of the blue channel, the green channel, and the red channel, none is good in all aspects of brightness, polarization performance, durability under a condition of high temperature and high humidity, and resistance to prolonged irradiation of light. Improvement is thus desired.

As a dye having absorption characteristics especially for the blue channel (400 to 500 nm), there are used C.I. Direct Yellow 12, C.I. Direct Yellow 28, C.I. Direct Yellow 44, C.I. Direct Orange 39, C.I. Direct Orange 72, C.I. Direct Orange 26, and dyes described in Patent Documents 1 to 3, and the like. However, polarization characteristics of the polarizing film using these dyes are poor, causing problems that, when displaying white images, yellowish images are provided and the color temperatures do not rise.

Patent Document 1: JP-A-2001-108828
Patent Document 2: JP-A-2001-240762
Patent Document 3: JP-A-2003-215338
Patent Document 4: JP-A-60-168743
Patent Document 5: JP-A-2003-35819
Patent Document 6: JP-A-2001-33627
Patent Document 7: Japanese Patent No. 2622748
Patent Document 8: JP-A-60-156759
Non-patent Document 1: "Senryo Kagaku (Dye Chemistry)" by Yutaka Hosoda (Published by Gihodo Co., Ltd., Japan) p. 626

DISCLOSURE OF THE INVENTION

An object of the present invention is to provide a polarizing plate of high performance having excellent polarization performance and resistance to humidity, heat, and light. Further, another object of the present invention is to provide a polarizing plate of high performance which does not cause color leakage at the perpendicular position in the wavelength range of visible light and which has excellent polarization performance and resistance to humidity, heat, and light, the polarizing plate being a neutral color polarizing plate produced by adsorbing two or more dichromatic dyes in a polymer film, followed by orientation thereof.

A further object of the present invention is to provide color polarizing plates of high performance corresponding to three primary colors for a color liquid crystal projector, which are good in all of brightness, polarization performance, durability, and light resistance.

The present inventors conducted diligent research in order to accomplish these objects and, as a result, found that a polarizing film and a polarizing plate comprising a novel azo compound and/or a salt thereof show excellent polarizing performance and resistance to humidity, heat, and light. This finding led to the present invention. Namely, the present invention includes the following embodiments:

(1) An azo compound represented by the following formula (1) and a salt thereof:

(6) A dye-containing polarizing film comprising two or more azo compounds and/or salts thereof according to any of (1) to (3), and at least one other organic dye, contained in a polarizing film substrate.
(7) The dye-containing polarizing film according to any one of (4) to (6), wherein the polarizing film substrate is a film comprising a polyvinyl alcohol resin
(8) A dye-containing polarizing plate comprising a transparent protective layer adhered on at least one surface of a dye-containing polarizing film according to any one of (4) to (7).
(9) A color polarizing plate for a liquid crystal projector, wherein a dye-containing polarizing film or a dye-containing polarizing plate according to any one of (4) to (8) is used.

The azo compound and salt thereof of the present invention are useful as a dye for a polarizing film. The polarizing film containing these compounds has a high polarizing performance comparable to a polarizing film using iodine and also has excellent durability. Thus, the former polarizing film is suitable for various liquid crystal displays and liquid crystal projectors, in-vehicle applications which require high polarizing performance and durability, and for applications in industrial instrument displays used in various environments.

BEST MODE FOR CARRYING OUT THE INVENTION

The present invention relates to an azo compound represented by the formula (1) in the form of a free acid and a salt

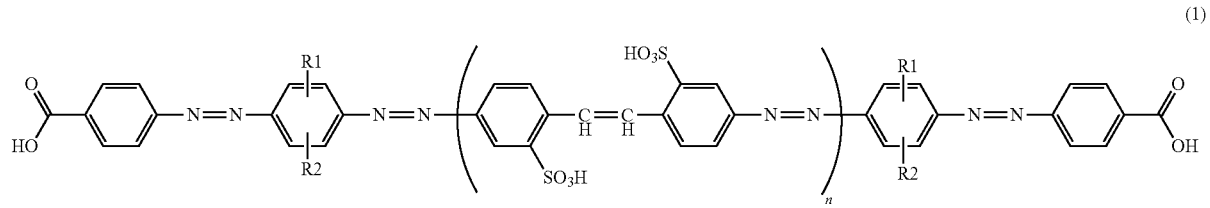

(1)

wherein R1 and R2 each independently represent a hydrogen atom, a lower alkyl group, and a lower alkoxy group; n is 1 or 2.
(2) The azo compound and a salt thereof according to (1), wherein R1 and R2 are each independently one of a hydrogen atom, a methyl group, and a methoxy group.
(3) The azo compound and a salt thereof according to (1), wherein R1 and R2 are a hydrogen atom.

(4) A dye-containing polarizing film comprising at least one azo compound and/or salt thereof according to any one of (1) to (3), contained in a polarizing film substrate.

(5) A dye-containing polarizing film comprising at least one azo compound and/or salt thereof according to any one of (1) to (3), and at least one other organic dye, contained in a polarizing film substrate.

thereof. In the formula (1), R1 and R2 are each independently a hydrogen atom, a lower alkyl group, and a lower alkoxy group; preferably R1 and R2 are a hydrogen atom and a lower alkyl group; especially preferably R1 is a hydrogen atom or a methyl group and R2 is a hydrogen atom; and n represents 1 or 2. In the present invention, a lower alkyl group and a lower alkoxy group refer to an alkyl group and an alkoxy group, both having 1 to 4 carbon atoms. Next, specific examples of azo compounds represented by the formula (1), which are used in the present invention, are shown below (formulae (2) to (6)). In the following formulae, the sulfonic acid group, carboxylic group, and hydroxyl group are shown in free acid forms.

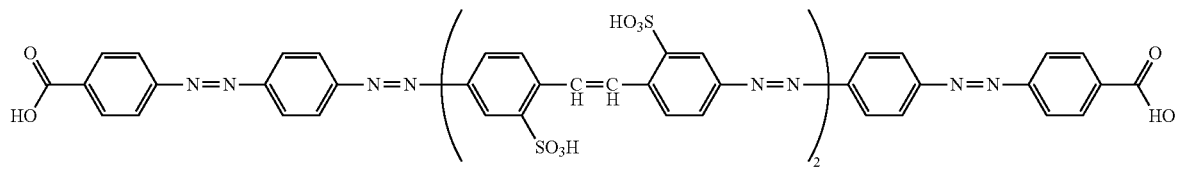

(2)

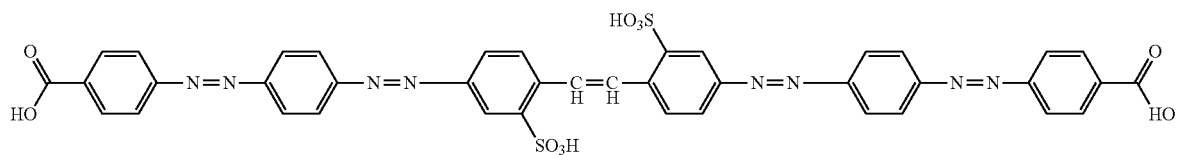

(3)

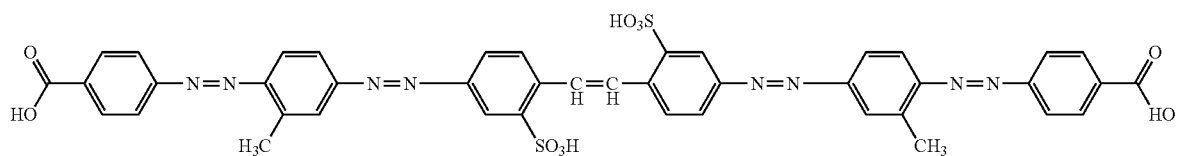

(4)

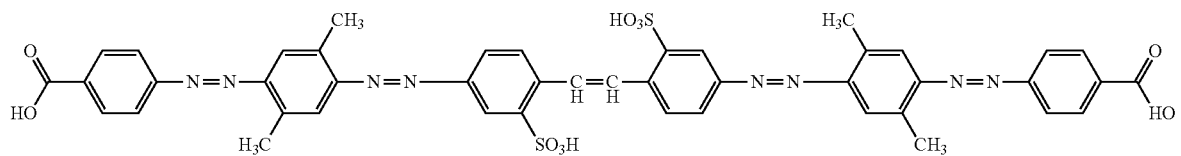

(5)

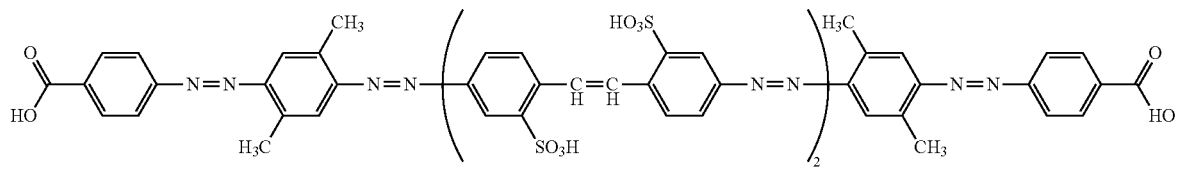

(6)

The azo compound represented by the formula (1) in the form of a free acid can easily be manufactured by carrying out publicly known diazotization and coupling reactions according to a general manufacturing method of azo dyes such as described in Non-Patent Document 1. As a specific method of manufacture, 4-aminobenzoic acid is diazotized and coupled with an aniline represented by the following formula (A) to obtain a monoazoamino compound (the following formula (B)).

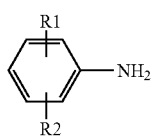

(A)

wherein R1 and R2 represent the same meaning as in the formula (1).

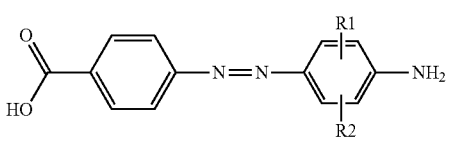

(B)

Then, this monoazoamino compound is reacted with 4,4'-dinitrostilbene-2,2'-sulfonic acid under an alkaline condition, followed by reduction with glucose to obtain the azo compound represented by the formula (1).

In the above reaction, the diazotization step may be carried out according to a usual method of mixing a nitrite salt such as sodium nitrite into a solution or a suspension of a diazo component in an aqueous mineral acid such as aqueous hydrochloric acid or aqueous sulfuric acid, or it may be carried out according to a reverse method where a nitrite salt is added beforehand to a neutral or weakly alkaline aqueous solution of the diazo component and this solution is mixed with the mineral acid. The temperature of diazotization is suitably −10 to +40° C. Further, the coupling step with an aniline is carried out by mixing an acidic aqueous solution of the latter in aqueous hydrochloric acid, aqueous acetic acid, or the like with the respective abovementioned diazo solutions and reacting at a temperature of −10 to +40° C. under an acidic condition of pH 2 to 7.

In a reaction of the monoazoamino compound with 4,4'-dinitrostilbene-2,2'-sulfonic acid, the condensation step under an alkaline condition is carried out under a strongly alkaline condition by use of sodium hydroxide, lithium hydroxide, and the like. The concentration of the alkali is suitably 2% to 10% and the temperature is suitably 70 to 100° C. The number for n in the formula (1) can be adjusted by changing the charging ratio of the monoazoamino compound and 4,4'-dinitrostilbene-2,2'-sulfonic acid. In the glucose reduction step, it is common to use 0.5 to 1.2 equivalents of glucose under an alkaline condition.

Further, in the present invention, the azo compound represented by the formula (1) may be used as a free acid and, as a salt as well. The salt includes alkali metal salts such as a lithium salt, a sodium salt, a potassium salt, and the like; an ammonium salt; and organic salts such as an amine salt. Generally, a sodium salt is used.

In the synthesis of an azo compound represented by the formula (1), the substituent of the primary coupling component, anilines which may have substituents (R1, R2), includes a methyl group, an ethyl group, a methoxy group, and an ethoxy group. Any one or two of these substituents may be attached. The position of their attachment is, relative to the amino group, position 2, position 3, positions 2 and 5, positions 3 and 5, or positions 2 and 6. Among these, attachment to position 3 and positions 2 and 5 is preferable. Examples of the anilines include, for example, aniline, 2-methylaniline, 3-methylaniline, 2-ethylaniline, 3-ethylaniline, 2,5-dimethylaniline, 2,5-diethylaniline, 2-methoxyaniline, 3-methoxyaniline, 2-methoxy-5-methylaniline, 2,5-dimethoxyaniline, 3,5-dimethylaniline, 2,6-dimethylaniline, and 3,5-dimethoxyaniline. The amino group of these anilines may be protected. As the protecting group, there may be mentioned a ω-methanesulfonic acid group.

Further, in the polarizing film or polarizing plate of the present invention, the azo compound represented by the formula (1) or a salt thereof may be used singly or in combination of several kinds. Also, as required, one or more other organic dyes may be used together. There is no particular restriction on dyes which are used together, but they are preferably dyes having absorption characteristics in a wavelength range different from those of the azo compounds or salts thereof according to the present invention and having high dichroism. Examples include C.I. Direct Red 2, C.I. Direct Red 31, C.I. Direct Red 79, C.I. Direct Red 81, C.I. Direct Red 247, C.I. Direct Green 80, C.I. Direct Green 59, and the dyes described in Patent Document Nos. 5 to 8. These dyes may be used as free acids, alkali metal salts (for example, Na salt, K salt, Li salt), ammonium salts, or amine salts.

When other organic dyes are used together as required, the kind of organic dye incorporated varies depending on whether the intended polarizing film is a neutral polarizing film, a color polarizing film for a liquid crystal projector, or other color polarizing film. The proportion of one or more kinds of the above organic dyes incorporated collectively is not particularly limited, but is generally preferably in the range of 0.1 to 10 parts by weight based on the weight of the azo compound of the formula (1) or a salt thereof.

The polarizing films having various hues and neutral color used for the polarizing plates of the present invention or the polarizing plates for a liquid crystal projector can be prepared by incorporating the azo compounds represented by the formula (1) or salts thereof together with other organic dyes as necessary into a polymer film, a material for the polarizing film, by a publicly known method. To the polarizing film obtained is attached a protecting film to produce a polarizing plate, and then, as required, a protecting layer or an AR (anti-reflection) layer, a support, and the like are disposed thereon, to be used for a liquid crystal projector, an electronic calculator, a watch, a notebook computer, a word processor, a liquid crystal television, a car navigation system, indoor and outdoor measuring instruments, a display, and the like.

As the substrate (polymer film) used for the polarizing film of the present invention, polyvinyl alcohol substrates are preferable. As the polyvinyl alcohol substrates, there may be cited, for example, polyvinyl alcohol or a derivative thereof, and those obtained by modifying either of these with an olefin such as ethylene or propylene; an unsaturated carboxylic acid such as crotonic acid, acrylic acid, methacrylic acid, or maleic acid; and the like. Among these, a film comprising polyvinyl alcohol or a derivative thereof is preferably used in terms of an adsorption property towards dyes and an orientation property. The thickness of the substrate is usually 30 to 100 μm, preferably about 60 to 90 μm.

In incorporating the azo compound of the formula (1) or a salt thereof into such a polymer film, a method of dyeing the polymer film is usually adopted. Dyeing, for example, is carried out as follows. First, the azo compound and/or a salt thereof according to the present invention and other dyes, as required, are dissolved in water to prepare a dye bath. The concentration of dyes in the dye bath is not particularly limited but usually selected from the range of about 0.001 to 10% by weight. Furthermore, a dyeing auxiliary may be used as required and, for example, sodium sulfate is suitably used in a concentration of about 0.1 to 10% by weight. Dyeing is carried out by dipping the polymer film in the dye bath thus prepared for 1 to 10 minutes. The dyeing temperature is preferably about 40 to 80° C.

Orientation of the water-soluble dye is carried out by stretching the polymer film dyed as described above. As a stretching method, any publicly known method such as a wet method, dry method, and the like may be employed. In some cases, stretching of the polymer film may be done before dyeing. In this case, orientation of the water-soluble dye is performed at the time of dyeing. The polymer film in which the water-soluble dye is incorporated and oriented may, as required, be subjected to an after-treatment such as a boric acid treatment by a publicly known method. Such an after-treatment is carried out in order to improve light transmittance and degree of polarization of the polarizing film. The condition of the boric acid treatment varies depending on the kind of polymer film used and the kind of dye used. In general, the concentration of boric acid in its aqueous solution is in the range of 0.1 to 15% by weight, preferably 1 to 10% by weight, and the treatment is carried out by dipping at the temperature range of 30 to 80° C., preferably 40 to 75° C., for 0.5 to 10 minutes. Further, the polymer film may, as required, be subjected to a fixing treatment at the same time with an aqueous solution containing a cationic polymer compound.

To one or both surfaces of the dye-containing polarizing film of the present invention thus obtained, transparent protective films excellent in optical transparency and mechanical strength may be adhered to produce a dye-containing polarizing plate. As a material to form the protective film, there may be used, for example, a cellulose acetate film, an acrylic film, a fluorinated film such as tetrafluoroethylene/hexafluoropropylene copolymer, and a film composed of a polyester resin, a polyolefin resin, or a polyamide resin. Preferably, a triacetyl cellulose (TAC) film or a cycloolefin film may be used. The thickness of the protective film is usually 40 to 200 μm.

An adhesive which may be used to adhere the polarizing film and the protective film together includes a polyvinyl alcohol (PVA) adhesive, an urethane emulsion adhesive, an acrylic adhesive, a polyester-isocyanate adhesive, and the like. Of these, the polyvinyl alcohol adhesive is suitable.

Furthermore, a transparent protective layer may be provided on the surface of the dye-containing polarizing plate of the present invention. As the protective layer, there may be cited, for example, an acrylic or polysiloxane hard coat layer and a urethane protective layer. Further, in order to improve the single plate light transmittance further, it is preferable to provide an AR layer on this protective layer. The AR layer may be formed, for example, by a vapor deposition or sputtering treatment of a substance such as silicon dioxide or titanium dioxide. The AR layer may also be formed by thinly coating a fluorinated substance. In addition, the dye-containing polarizing plate of the present invention may also be used as an elliptically polarizing plate in which a phase difference plate is adhered.

The dye-containing polarizing plate of the present invention thus constituted has a neutral color, causes no color leakage at the perpendicular position in the wavelength range of visible light, and shows excellent polarization performance. Further, it has characteristics that even under conditions of high temperature and high humidity, it shows no discoloration, no deterioration of polarization performance, and little light leakage at perpendicular position in the range of visible light.

In the present invention, the color polarizing plate for a liquid crystal projector includes, as a dichromatic molecule, the azo compound represented by the formula (1) and/or a salt thereof and further, as required, other organic dyes mentioned above. Also, the polarizing film used for a color polarizing plate for a liquid crystal projector is produced by the same method as that for the aforementioned dye-containing polarizing film. A protective film is further attached to the polarizing film to produce a dye-containing polarizing plate, which is, as required, provided with a protective layer, an AR layer, a support, and the like, and is used as a color polarizing plate for a liquid crystal projector.

As a color polarizing plate for a liquid crystal projector, preferably, the single plate average light transmittance is 39% or higher and the average light transmittance at perpendicular position is 0.4% or less in the wavelength range necessary for the polarizing plate (A. When an ultra-high pressure mercury lamp is used: 420 to 500 nm for the blue channel, 500 to 580 nm for the green channel, and 600 to 680 nm for the red channel; B. Peak wavelength when three primary color LED lamps are used: 430 to 450 nm for the blue channel, 520 to 535 nm for the green channel, 620 to 635 nm for the red channel). More preferably, in the wavelength range necessary for the polarizing plate, the single plate average light transmittance is 41% or higher and the average light transmittance at the perpendicular position is 0.3% or less, more preferably 0.2% or less. Still more preferably, in the wavelength range necessary for the polarizing plate, the single plate average light transmittance is 42% or higher and the average light transmittance at the perpendicular position is 0.1% or less. As mentioned above, the color polarizing plate for a liquid crystal projector of the present invention has brightness and excellent polarization performance.

The color polarizing plate for a liquid crystal projector of the present invention is preferably a polarizing plate with an AR layer which is obtained by providing the above-mentioned AR layer on a polarizing plate consisting of a polarizing film and a protective film. Further, a polarizing plate with an AR layer and a support is more preferable, which is obtained by adhering the polarizing plate with an AR layer to a support such as a transparent glass plate.

In addition, the single plate average light transmittance is an average value of light transmittance in a specific wavelength range when natural light enters one polarizing plate without an AR layer and a support such as a transparent glass plate provided (hereafter simply referred to as "polarizing plate" in the same sense). The average light transmittance at the perpendicular position is an average value of light transmittance in a specific wavelength range when natural light enters two polarizing plates, which are superimposed with the orientation directions perpendicular to each other.

The color polarizing plate for a liquid crystal projector of the present invention is used generally as a polarizing plate with a support. The support preferably has a planar section because a polarizing plate is adhered thereto. Also, the support is preferably a molded article of glass because the polarizing plate is put to an optical use. As a molded article of glass, there may be cited, for example, a glass plate, a lens, a prism (for example, a triangle prism or a cubic prism). A lens to which is adhered the polarizing plate may be used as a condenser lens with a polarizing plate in a liquid crystal projector. Also, a prism to which is adhered the polarizing plate may be used as a polarizing beam splitter with a polarizing plate or a dichromatic prism with a polarizing plate in a liquid crystal projector. Further, the polarizing plate may be adhered to a liquid crystal cell. As the glass material, there may be mentioned inorganic glass such as soda glass, borosilicate glass, and sapphire glass; organic glass such as acrylic and polycarbonate; and the like. Preferable is inorganic glass. The thickness and size of a glass plate may be chosen as desired. Also, in order to further improve the single plate light transmittance of the polarizing plate with a glass, it is preferable to provide an AR layer on one or both sides of the glass surface or polarizing plate surface.

In order to produce a polarizing plate with a support for a liquid crystal projector, for example, a transparent adhesive (pressure-sensitive adhesive) is coated on the planar section of the support and then the polarizing plate of the present invention is attached to this coated surface. Also, a transparent adhesive (pressure-sensitive adhesive) may be coated on the polarizing plate and then a support may be attached to this coated surface. As the adhesive (pressure-sensitive adhesive) used herein, for example, an acrylic ester adhesive is preferable. In addition, when this polarizing plate is used as an elliptically polarizing plate, usually a phase difference plate side is adhered to the support, but the polarizing plate side may be adhered to the molded article of glass.

In a color liquid crystal projector using the polarizing plate of the present invention, the polarizing plate of the present invention is disposed on either one or both of the incident side and outgoing side of a liquid crystal cell. The polarizing plate may or may not be in contact with the liquid crystal cell, but, in terms of durability, it is preferable that the plate is not in contact with the liquid crystal cell. When the polarizing plate is in contact with the liquid crystal cell at the outgoing side, there may be used a polarizing plate of the present invention having the liquid crystal cell as a support. When the polarizing plate is not in contact with the liquid crystal cell, there may preferably be used a polarizing plate of the present invention using a support other than the liquid crystal cell. Furthermore, in terms of durability, the polarizing plates of the present invention are preferably disposed on both the incident side and outgoing side of the liquid crystal cell. Further, it is preferable that the polarizing plate surface of the polarizing plate of the present invention is disposed on the liquid crystal cell side, with the support surface thereof on the light source side. In addition, the incident side of the liquid crystal cell means the light source side, and the opposite side is referred to as the outgoing side.

In a color liquid crystal projector using the polarizing plate of the present invention, an ultraviolet light-cutting filter is preferably disposed between the light source and the polarizing plate with a support on the incident side. Further, the liquid crystal cell used is preferably, for example, an active matrix type, which is formed by encapsulating liquid crystals between a transparent substrate on which an electrode and a TFT (thin film transistor) are formed and, another transparent substrate on which the counter electrode is formed. Light emitted from a light source such as an ultra-high pressure mercury lamp (UHP lamp), a metal halide lamp, a white LED, and the like passes through the ultraviolet light-cutting filter, and separates into three primary colors, which then passes through the respective color polarizing plates with supports for each of blue, green, and red channels. The light is then integrated, magnified by a projector lens, and projected onto a screen. Alternatively, using LEDs corresponding to each of blue, green, and red colors, light emitted from LED of each color passes through respective color polarizing plates with supports for each of blue, green, and red channels, then is integrated, magnified by a projector lens, and projected onto a screen.

The polarizing plate for a color liquid crystal projector thus constituted has characteristics that its polarization performance is excellent, and, furthermore, discoloration and deterioration of polarization performance do not occur even under a high temperature and high humidity condition.

EXAMPLES

Hereinafter the present invention will be described in more detail in terms of Examples.

However, examples are for illustrative purposes only and not meant to limit the scope of the present invention in any manner. In Examples, % and parts are based on weight, unless otherwise noted.

Example 1

13.7 parts of 4-aminobenzoic acid was added to 500 parts of water and dissolved with sodium hydroxide. After cooling, 32 parts of 35% aqueous hydrochloric acid and subsequently 6.9 parts of sodium nitrite were added at a temperature of 10° C. or below, and the reaction mixture was stirred at 5 to 10° C. for 1 hour. To this was added 20.9 parts of sodium aniline-1-methanesulfonate and, while the reaction mixture was stirred at 20 to 30° C., sodium carbonate was added to adjust the pH to 3.5. By further stirring, the coupling reaction was completed and a monoazo compound was obtained by filtration. The monoazo compound obtained was stirred at 90° C. in the presence of sodium hydroxide to obtain 17 parts of a monoazo compound represented by the following formula (7).

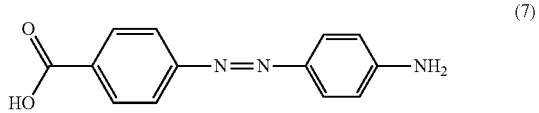 [SMILES: Nc1ccc(N=Nc2ccc(C(=O)O)cc2)cc1]

(7)

After 12 parts of the monoazo compound represented by the formula (7) and 21 parts of 4,4'-dinitrostilbene-2,2'-sulfonic acid were dissolved in 300 parts of water, 12 parts of sodium hydroxide was added and the reaction mixture was subjected to condensation reaction at 90° C. Then, the reaction mixture was reduced by 9 parts of glucose, salted out with sodium chloride, and filtered to obtain 16 parts of the azo compound represented by the formula (2). This compound was orange in color and its solution in 20% aqueous pyridine showed an absorption maximum at a wavelength of 444 nm.

Example 2

After 12 parts of the monoazo compound represented by the formula (7) and 10 parts of 4,4'-dinitrostilbene-2,2'-sulfonic acid were dissolved in 300 parts of water, 24 parts of sodium hydroxide was added and the reaction mixture was subjected to condensation reaction at 90° C. Then, the reaction mixture was reduced by 18 parts of glucose, salted out with sodium chloride, and filtered to obtain 20 parts of the azo compound represented by the formula (3). This compound was orange in color and its solution in 20% aqueous pyridine showed an absorption maximum at a wavelength of 428 nm.

Example 3

To 500 parts of water was added 13.7 parts of 4-aminobenzoic acid and was dissolved with sodium hydroxide. After cooling, 32 parts of 35% aqueous hydrochloric acid and, subsequently, 6.9 parts of sodium nitrite were added at a temperature of 10° C. or below and the reaction mixture was stirred at 5 to 10° C. for 1 hour. To this was added 13.7 parts of 2-methoxy-5-methylaniline and, while the reaction mixture was stirred at 20 to 30° C., sodium carbonate was added to adjust the pH to 3.5. By further stirring, the coupling reaction was completed and the reaction mixture was filtered to obtain a monoazo compound. The monoazo compound obtained was stirred at 90° C. in the presence of sodium hydroxide to obtain 26 parts of monoazo compound represented by the following formula (8).

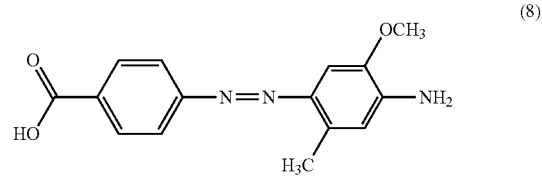 [SMILES: COc1cc(N=Nc2ccc(C(=O)O)cc2)c(C)cc1N]

(8)

In 300 parts of water, 14 parts of the monoazo compound represented by the formula (8) and 21 parts of 4,4'-dinitrostilbene-2,2'-sulfonic acid were dissolved and, after addition of 12 parts of sodium hydroxide, were condensation reacted at 90° C. Then, the reaction mixture was reduced by 9 parts of glucose, salted out with sodium chloride, and filtered to obtain 16 parts of the azo compound represented by the formula (6). This compound was red in color and its solution in 20% aqueous pyridine showed an absorption maximum at a wavelength of 444 nm.

Example 4

In an aqueous solution kept at 45° C. containing a dye of the compound (2) obtained in Example 1 in a concentration of 0.01% and sodium sulfate in a concentration of 0.1%, a polyvinyl alcohol film of 75 μm in thickness was dipped for 4 minutes. This film was stretched 5-folds at 50° C. in a 3% aqueous boric acid solution, washed with water in the stretched state, and dried to obtain a polarizing film.

In Table 1 are shown the (a) maximum absorption wavelength, (b) single plate transmittance, (c) polarization coefficient, and (d) contrast ratio, (b) to (d) being measured at the maximum absorption wavelength of the polarizing film obtained.

The transmittance (completely polarized light transmittance (parallel: Ky, perpendicular: Kz)) of polarized light which was radiated in directions parallel and perpendicular to the direction of orientation of the polarizing film obtained in the foregoing was measured by a spectrophotometer (U-4100, manufactured by Hitachi, Ltd.).

The polarization coefficient, single plate transmittance of natural light, transmittance at the perpendicular position when two polarizing plates are superimposed with the directions of orientation perpendicular to each other, and contrast ratio were calculated according to the following equations (1) to (4) from the values of Ky and Kz, obtained by the aforementioned measurements.

(Polarization coefficient)=$(Ky-Kz)/(Ky+Kz)$ (1)

(Single plate transmittance)=$(Ky+Kz)/2$ (2)

(Transmittance at perpendicular position)=$Ky \times Kz/100$ (3)

(Contrast ratio)=$Ky/Kz$ (4)

Example 5

Using an aqueous solution kept at 45° C. containing a dye of the compound (3) obtained in Example 2 in a concentration of 0.03% and sodium sulfate in a concentration of 0.01%, a polarizing film was prepared in the same manner as in Example 4. In Table 1 are shown its (a) maximum absorption wavelength, (b) single plate transmittance, (c) polarization coefficient, and (d) contrast ratio, (b) to (d) being measured at the maximum absorption wavelength.

Comparative Example 1

Except that 0.01% aqueous solution of C.I. Direct Orange 39 (a dye comprising, as a major component, the compound represented by the following structural formula (9)), was used instead of the compound (2) obtained in Example 1, a polarizing film was prepared in the same manner as in Example 4. Its (a) maximum absorption wavelength, (b) single plate transmittance, (c) polarization coefficient, and (d) contrast ratio, (b) to (d) being measured at the maximum absorption wavelength, are shown in Table 1, which shows that the polarization coefficient and contrast ratio at the same transmittance were greatly inferior to Examples 4 and 5.

TABLE 1

| | Compound | Maximum absorption wavelength | Single plate transmittance | Polarization coefficient | Contrast ratio |
|---|---|---|---|---|---|
| Example 4 | (2) | 462 nm | 43.79% | 99.55% | 443 |
| Example 5 | (3) | 445 nm | 43.82% | 99.43% | 350 |
| Comparative Example 1 | (9) | 447 nm | 43.79% | 99.24% | 262 |

Example 6

In an aqueous solution kept at 45° C. containing a dye of the compound (2) obtained in Example 1 in a concentration of 0.01%, C.I. Direct Red 81 in a concentration of 0.01%, a dye represented by the following structural formula (10) described in Example 1 of Patent Document 7 in a concentration of 0.03%, a dye represented by the following structural formula (11) disclosed in Example 23 of Patent Document 8 in a concentration of 0.03%, and sodium sulfate in a concentration of 0.1%, a polyvinyl alcohol film of 75 μm in thickness dipped for 4 minutes. This film was stretched 5-folds at 50° C. in a 3% aqueous boric acid solution, washed with water in the stretched state, and dried to obtain a polarizing film of neutral color (gray in the parallel position, black in the perpendicular position). The single plate average light transmittance, polarization coefficient, and contrast ratio of the polarizing plate, obtained over an entire range of visible light, are as shown in Table 2 and had a high polarization coefficient.

Further, TAC films (80 μm in film thickness, trade name TD-80U, produced by Fujifilm Corporation) were adhered on both surfaces of the polarizing film using a PVA adhesive to obtain a polarizing plate of the present invention. On one side of this polarizing plate, an acrylic ester pressure sensitive adhesive was applied to afford an adhesive-backed polarizing plate. This was cut in a size of 30 mm×40 mm and was adhered onto a glass plate of the same size. When this polarizing plates were stored at a high temperature conditions of 105° C. for 1200 hours and at a high temperature and high humidity conditions of 85° C.×85% RH for 1200 hours, the changes in polarization coefficients were less than 0.1%, showing a long-time durability of the polarizing plates even under a high temperature and high humidity conditions.

(9)

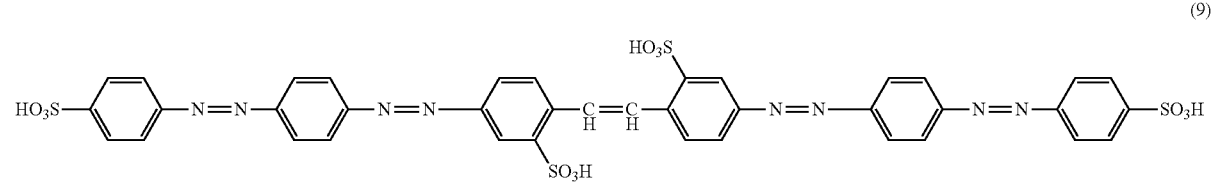 [SMILES: O=S(=O)(O)c1ccc(N=Nc2ccc(N=Nc3ccc(C=Cc4ccc(N=Nc5ccc(N=Nc6ccc(S(=O)(=O)O)cc6)cc5)cc4S(=O)(=O)O)c(S(=O)(=O)O)c3)cc2)cc1]

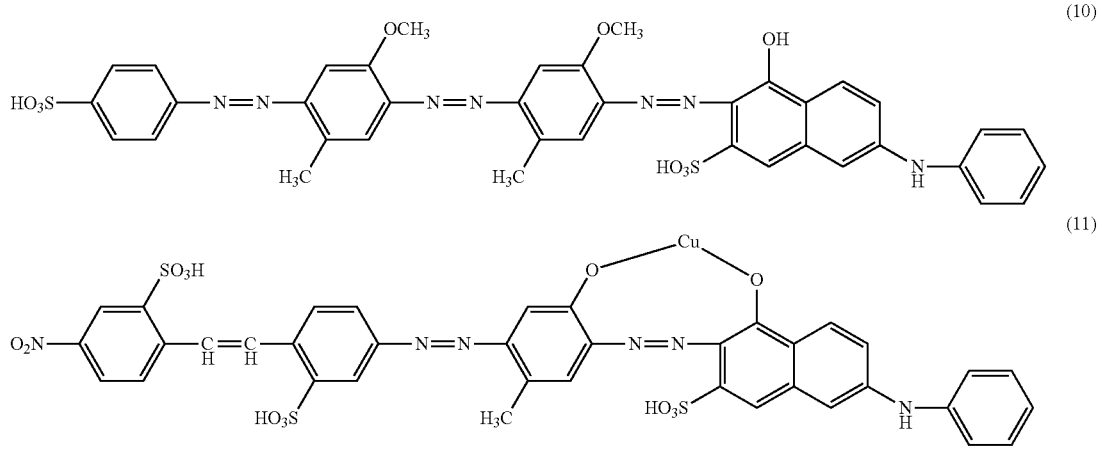

(10)

(11)

Comparative Example 2

Except that a 0.01% aqueous solution of C.I. Direct Orange 39 was used instead of the compound (2) obtained in Example 1, a neutral color polarizing film was prepared in the same manner as in Example 6. The single plate average light transmittance, polarization coefficient and contrast ratio over an entire range of visible light are shown in Table 2. Compared to the polarizing film of Example 6, not only the single plate average light transmittance was low, but also polarizing characteristics and contrast ratio were greatly inferior.

TABLE 2

|  | Single plate average light transmittance | Polarization coefficient | Contrast ratio |
| --- | --- | --- | --- |
| Example 6 | 43.99% | 99.61% | 511 |
| Comparative Example 2 | 43.82% | 99.28% | 277 |

Example 7

In an aqueous solution kept at 45° C. containing a dye of the compound (2) obtained in Example 1 in a concentration of 0.05%, C.I. Direct Yellow 28 in a concentration of 0.01%, a dye represented by the following structural formula (12) described as compound No. 1 in Patent Document 3 in a concentration of 0.01%, and sodium sulfate in a concentration of 0.1%, a polyvinyl alcohol film of 75 μm in thickness was dipped for 4 minutes. This film was stretched 5-folds at 50° C. in a 3% aqueous boric acid solution, washed with water in the stretched state, and dried to obtain a polarizing film. The maximum absorption wavelength (λmax) of the polarizing film obtained was 450 nm, and in the range of 430 to 500 nm, the single plate average light transmittance, average light transmittance at perpendicular position and contrast ratio are as shown in Table 3 and had a high polarization coefficient. Further, a TAC film (80 μm in film thickness, trade name TD-80U, produced by Fujifilm Corporation) was adhered on one side of the polarizing film and on the other side of the polarizing film, a TAC film, on one side of which had been formed a UV (ultraviolet light) curable hard coat layer in about 10 μm thickness, was adhered using a PVA adhesive to obtain a polarizing plate of the present invention. On one side of this polarizing plate, an acrylic ester pressure sensitive adhesive was applied to afford a polarizing plate with a pressure sensitive adhesive layer. Further, on the outer surface of the hard coat layer, AR (anti-reflection) multi-coating treatment was conducted by vacuum deposition. This was cut in a size of 30 mm×40 mm and was adhered onto a transparent glass plate of the same size with an AR layer on one side to obtain a color polarizing plate with an AR support for a liquid crystal projector (for the blue channel) of the present invention. The color polarizing plate for a liquid crystal projector of the present Example had a high polarization coefficient and, moreover, showed a long lasting durability even at conditions of high temperature and high humidity. Also, resistance to prolonged irradiation of light was excellent.

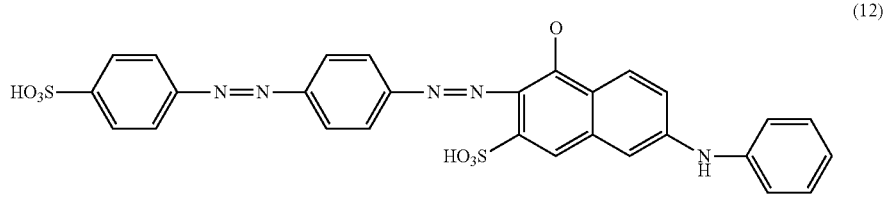 [SMILES: O=S(=O)(O)c1ccc(N=Nc2ccc(N=Nc3c(S(=O)(=O)O)cc4cc(Nc5ccccc5)ccc4c3O)cc2)cc1]

(12)

Example 8

Except that an aqueous solution kept at 45° C. containing a dye of the compound (3) obtained in Example 2 in a concentration of 0.05%, C.I. Direct Yellow 28 in a concentration of 0.01%, a dye represented by the structural formula (12) described as compound No. 1 in Patent Document 3 in a concentration of 0.01%, and sodium sulfate in a concentration of 0.1% was used, a polarizing plate was prepared in the same manner as in Example 7. The single plate average light transmittance, average light transmittance at the perpendicular position, and contrast ratio of the polarizing plate in the range of 430 to 500 nm are shown in Table 3, which had a high polarization coefficient.

Comparative Example 3

Except that an aqueous solution kept at 45° C. containing C.I. Direct Orange 39 in a concentration of 0.05%, C.I. Direct Yellow 28 in a concentration of 0.01%, a dye represented by the aforementioned structural formula (12) described as compound No. 1 in Patent Document 3 in a concentration of 0.02%, and sodium sulfate in a concentration of 0.1% was used, a polarizing plate was prepared in the same manner as in Example 7. This polarizing plate showed the single plate average light transmittance, average light transmittance at perpendicular position, and contrast ratio, in a range of 430 to 500 nm, as listed in Table 3. When the average light transmittance at the perpendicular position was adjusted to the same level as Examples 7 and 8, the single plate average light transmittance was lower by about 1% and the contrast ratio was also inferior. Further, when the single plate average light transmittance was adjusted to the same level as Examples 7 and 8, the performance of contrast ratio was greatly inferior, being ⅓ or less.

TABLE 3

| | Single plate average light transmittance | Average light transmittance at perpendicular position | Contrast ratio |
|---|---|---|---|
| Example 7 | 41.71% | 0.01% | 3854 |
| Example 8 | 41.68% | 0.01% | 3577 |
| Comparative Example 3 (when average light transmittance at the perpendicular position was adjusted) | 40.89% | 0.01% | 3041 |
| Comparative Example 3 (when single plate average light transmittance was adjusted) | 41.67% | 0.04% | 1037 |

INDUSTRIAL APPLICABILITY

The azo compound and a salt thereof of the present invention are useful as dyes for polarizing films. Accordingly, the compound and the salt are used for various liquid crystal display devices and liquid crystal projectors. More specifically, they are suitable for in-vehicle applications and display applications for industrial instruments.

The invention claimed is:

1. A dye-containing polarizing film comprising at least one azo compound represented by the following formula (1) and/or salt thereof:

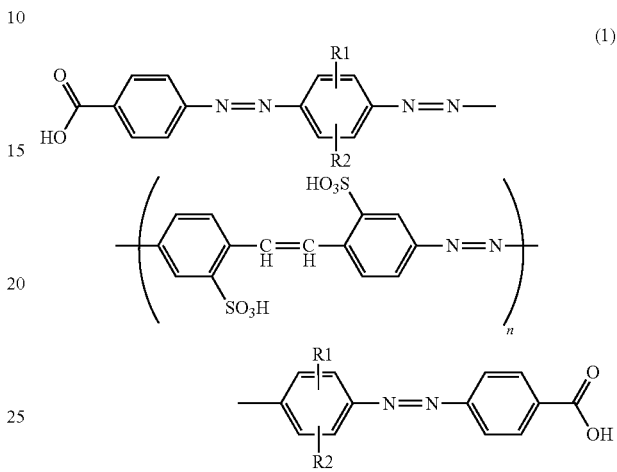

wherein R1 and R2 each independently represent a hydrogen atom, a lower alkyl group, and a lower alkoxy group; n is 2; contained in a polarizing film substrate.

2. The dye-containing polarizing film of claim 1, wherein R1 and R2 are each independently one of a hydrogen atom, a methyl group, and a methoxy group.

3. The dye-containing polarizing film of claim 1, wherein R1 and R2 are each a hydrogen atom.

4. The dye-containing polarizing film according to claim 1, wherein the polarizing film substrate is a film comprising a polyvinyl alcohol resin.

5. A dye-containing polarizing plate comprising a transparent protective layer adhered on at least one surface of a dye-containing polarizing film according to claim 1.

6. A color polarizing plate for a liquid crystal projector, wherein a dye-containing polarizing film according to claim 1 is used.

7. A color polarizing plate for a liquid crystal projector, wherein a dye-containing polarizing plate according to claim 5 is used.

8. A dye-containing polarizing film comprising at least one azo compound represented by the following formula (1) and/or salt thereof:

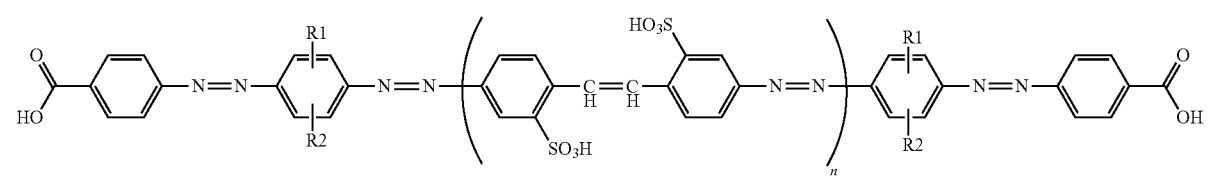

wherein R1 and R2 each independently represent a hydrogen atom, a lower alkyl group, and a lower alkoxy group; n is 2; and at least one other organic dye, contained in a polarizing film substrate.

9. The dye-containing polarizing film of claim 8, wherein R1 and R2 are each independently one of a hydrogen atom, a methyl group, and a methoxy group.

10. The dye-containing polarizing film of claim 8, wherein R1 and R2 are each a hydrogen atom.

11. The dye-containing polarizing film according to claim 8, wherein the polarizing film substrate is a film comprising a polyvinyl alcohol resin.

12. A dye-containing polarizing plate comprising a transparent protective layer adhered on at least one surface of a dye-containing polarizing film according to claim 8.

13. A color polarizing plate for a liquid crystal projector, wherein a dye-containing polarizing film according to claim 8 is used.

14. A color polarizing plate for a liquid crystal projector, wherein a dye-containing polarizing plate according to claim 12 is used.

15. A dye-containing polarizing film comprising two or more azo compounds represented by the following formula (1) and/or salts thereof:

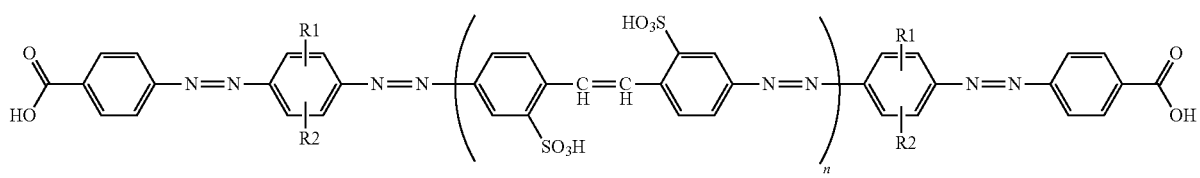

(1)

wherein R1 and R2 each independently represent a hydrogen atom, a lower alkyl group, and a lower alkoxy group; n is 2; and at least one other organic dye, contained in a polarizing film substrate.

16. The dye-containing polarizing film of claim 15, wherein R1 and R2 are each independently one of a hydrogen atom, a methyl group, and a methoxy group.

17. The dye-containing polarizing film of claim 15, wherein R1 and R2 are each a hydrogen atom.

18. The dye-containing polarizing film according to claim 15, wherein the polarizing film substrate is a film comprising a polyvinyl alcohol resin.

19. A dye-containing polarizing plate comprising a transparent protective layer adhered on at least one surface of a dye-containing polarizing film according to claim 15.

20. A color polarizing plate for a liquid crystal projector, wherein a dye-containing polarizing film according to claim 15 is used.

21. A color polarizing plate for a liquid crystal projector, wherein a dye-containing polarizing plate according to claim 19 is used.

* * * * *